United States Patent [19]
Kozlowski et al.

[11] Patent Number: 5,382,977
[45] Date of Patent: Jan. 17, 1995

[54] ELECTRONICALLY SCANNED BUFFERED DIRECT INJECTION CIRCUIT FOR STARING IR FOCAL PLANE ARRAY

[75] Inventors: Lester J. Kozlowski, Simi Valley; William E. Tennant, Thousand Oaks; William A. Kleinhans, Westlake Village, all of Calif.

[73] Assignee: Rockwell International Corporation, Seal Beach, Calif.

[21] Appl. No.: 124,845

[22] Filed: Sep. 21, 1993

Related U.S. Application Data

[63] Continuation of Ser. No. 825,480, Jan. 24, 1992, abandoned.

[51] Int. Cl.[6] .............................................. H04N 5/335
[52] U.S. Cl. ..................................... 348/300; 348/216
[58] Field of Search ................ 348/294, 297, 300, 301, 348/303, 304, 308; 250/216, 338.1, 336.1, 338.4, 332, 349; H04N 5/335

[56] References Cited

U.S. PATENT DOCUMENTS

| | | | |
|---|---|---|---|
| 4,555,623 | 11/1985 | Bridgewater et al. | 250/214 A |
| 4,743,762 | 5/1988 | Gaalema et al. | 250/336.1 |
| 4,779,004 | 10/1988 | Tew et al. | 250/578 |
| 4,862,002 | 8/1989 | Wang et al. | 250/352 |
| 4,978,872 | 12/1990 | Morse et al. | 307/490 |
| 5,021,854 | 6/1991 | Huth | 357/30 |
| 5,043,820 | 8/1991 | Wyles et al. | 358/213.28 |
| 5,128,534 | 7/1992 | Wyles | 250/208.1 |

FOREIGN PATENT DOCUMENTS

WO91/04633  4/1991  United Kingdom .......... H04N 3/15

Primary Examiner—Joseph Mancuso
Assistant Examiner—Tuan V. Ho
Attorney, Agent, or Firm—John C. McFarren

[57] ABSTRACT

An electronically scanned buffered direct injection (ESBDI) readout circuit is provided for a long wavelength infrared focal plane array (IR FPA). The ESBDI circuit comprises a cascoded CMOS inverter amplifier that allows high detector cell density and provides high voltage amplification, low input impedance, high charge capacity, and high sensitivity in a low power staring focal plane array. The amplifier employs a cascode FET to stabilize the amplifier operating point and to provide low noise access for each unit cell. Distributed capacitance along each bus line provides large overall charge capacity in a minimum of chip real estate. When not accessed, idle IR detector cells are clamped to an externally adjustable voltage to prevent excess detector noise and crosstalk. The circuit may be fabricated on a neutron transmutation doped silicon wafer to provide threshold uniformity and low power dissipation. For higher density applications, a common CMOS inverter amplifier may be shared among a group of detector cells within the focal plane array to reduce cell pitch and provide a high density IR FPA.

8 Claims, 3 Drawing Sheets

Output Bus

ELECTRONICALLY SCANNED BUFFERED DIRECT INJECTION CIRCUIT FOR STARING IR FOCAL PLANE ARRAY

This application is a continuation of application Ser. No. 825,480, filed Jan. 24, 1992, now abandoned.

TECHNICAL FIELD

The present invention relates to interface circuits for infrared (IR) focal plane arrays (FPAs) and, in particular, to an electronically scanned buffered direct injection (ESBDI) amplifier circuit having uniform detector bias, low input impedance, and high charge capacity for coupling IR detectors-to multiplexers in high density staring FPAs.

BACKGROUND OF THE INVENTION

Infrared detector systems operating in the medium wavelength infrared (MWIR) spectral band (3 to 5 μm wavelength) typically require sophisticated tracking algorithms to accommodate the large and often dynamic changes in background information that result from the relatively high contrast and solar content of the radiation. Detectors operating in the preferred long wavelength infrared (LWIR) spectral band (8 to 12 μm wavelength), however, can attain the same or greater thermal sensitivity with reduced signal processing complexity. As a result, infrared detection and tracking can be accomplished using smaller, more cost-effective sensors having LWIR focal plane arrays.

Unfortunately, LWIR focal plane arrays and multiplexing readout circuits have design constraints that can severely limit system performance. In the readout portion of a focal plane array, for example, the input amplifier cell circuitry that couples each detector to the corresponding readout site must perform several functions that are difficult to incorporate simultaneously in the small amount of cell "real estate" typically available on a signal processing chip. Ideally, a detector/amplifier cell of an FPA should include the following: 1) a detector interface stage that provides low impedance at a uniform operating bias; 2) a large charge handling integration capacitance; 3) a stage for uniform suppression of the background if integration capacity is inadequate; 4) low power pixel multiplexing and reset stages; and 5) an output stage adequate to drive the bus line capacitance for subsequent multiplexing at video rates.

Staring LWIR FPAs in formats up to 128×128 have been demonstrated in the prior art. These LWIR devices, however, are typically coupled to conventional MWIR readout circuits, which have several deficiencies that compromise system performance. For example, the limited charge handling capacity provides overall sensitivity no better than that achieved by a typical MWIR FPA. This negates one of the benefits of operation in the LWIR spectral band. Furthermore, prior art LWIR FPAs lack impedance buffering, which forces a reduction in detector cutoff wavelength (i.e., $\lambda_c$ no greater than about 9 μm) and an increase in fixed pattern noise (i.e., spatial noise remaining after application of conventional two-point non-uniformity correction). Fixed pattern noise creates a visible mask in the imagery that obscures low contrast, high frequency information, thus degrading (i.e., raising) the minimum resolvable temperature (MRT) and compromising performance under adverse or discriminating conditions. Moreover, prior art devices lack capability for reducing pixel pitch and increasing pixel density. If the pixel pitch and detector/amplifier cell real estate are reduced in prior art devices, the performance limitations are further aggravated.

Given the current photolithographic state-of-the-art and the limited chip area available, there is insufficient detector/amplifier cell real estate for a readout circuit with conventional staring architecture to integrate all of the most important features such as low input impedance, uniform detector bias, and satisfactory charge storage capacity. However, because small cells are necessary for FPAs with high pixel counts, integrated readout circuits with reasonable die sizes, and compact optics, all the important functions of the readout circuit must be integrated in as little chip real estate as possible. Thus, there is a need for a multiplexer readout circuit with improved architecture having characteristics that are better optimized for use in a staring LWIR FPA.

SUMMARY OF THE INVENTION

The present invention comprises an electronically scanned buffered direct injection (ESBDI) readout circuit for coupling IR detectors to the signal processor in high performance IR FPAs. Electronic scanning uses robust solid state electronics to emulate optomechanical scanning, which is normally performed in line arrays that are scanned using optomechanical assemblies. The circuit uses pipelined architecture with multiple bus lines to improve sensitivity compared with conventional scanning systems. The ESBDI circuit comprises a cascoded CMOS inverter amplifier that yields low input impedance and high charge capacity while providing high cell density and high sensitivity in a staring focal plane array. The circuits are fabricated using p-well CMOS devices and neutron transmutation doped (NTD) starting material for controlling the threshold nonuniformity to a standard deviation ($\sigma$) of less than 1 mV.

The cascoded CMOS inverter amplifier provides high voltage amplification for high density detector cells. The amplifier employs a cascode FET to stabilize the amplifier operating point and to function as a low noise access for each cell. In operation, each input amplifier cell is turned on by a clock signal to its associated cascode FET. The same clock also unclamps the cell to allow signal integration. When a detector is not being accessed, the clock sets the cell to zero bias to eliminate excess detector noise and electrical crosstalk.

The invention also employs discrete capacitors that can be selected independently by control logic, and/or additional distributed capacitance along each bus line, to achieve large overall charge capacity in a minimum of chip real estate. The distributed capacitance is used to store photo-generated charge rather than hinder circuit performance as in prior art circuit designs. Multiple bus lines are used to increase integration time duty cycle. For high density applications, where the detector cell pitch in staring FPAs is reduced to about 25 μm or less, a common CMOS inverter amplifier of the present invention may be shared among a group of several detector cells within a region of a mosaic focal plane array. In this detector sharing configuration, some storage capacitance is placed within the shared amplifier cell to allow integration while other regions of the FPA are being interrogated by the readout circuitry. Thus, a low impedance detector interface having selectable charge capacity is achieved by using a shared amplifier and distributed capacitance, which may be located either within the input amplifier cells and/or along the bus lines, for servicing the sub-array of detector elements.

A principal object of the invention is to provide a readout interface for a high density IR focal plane array. A feature of the invention is an electronically scanned buffered direct injection (ESBDI) readout circuit having a cascoded CMOS inverter amplifier combined with distributed capacitance. Advantages of the invention include low input impedance, low power dissipation, high voltage amplification, high charge capacity, high sensitivity, threshold uniformity, and a shared amplifier configuration for high density staring IR focal plane arrays.

BRIEF DESCRIPTION OF THE DRAWINGS

For a more complete understanding of the present invention and for further advantages thereof, the following Detailed Description of the Preferred Embodiments makes reference to the accompanying Drawings, wherein like reference numerals indicate the same or similar elements in the several Figures, in which.

DETAILED DESCRIPTION OF THE PREFERRED EMBODIMENTS

The present invention comprises an electronically scanned buffered direct injection (ESBDI) readout circuit and architecture for coupling a mosaic of detectors, thereby forming an infrared focal plane array (IR FPA). A typical IR FPA is a hybrid device that includes a mosaic of HgCdTe detectors on a transparent substrate. The detectors are mated, by means of indium bumps, to corresponding input amplifier cells of a signal processor on a silicon substrate.

Figure 1:
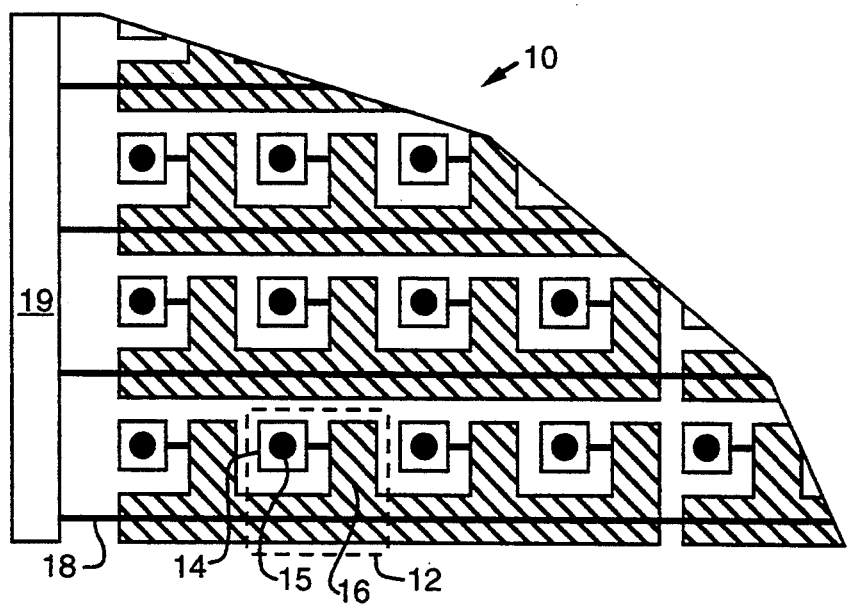
FIG. 1 is a diagrammatic overview of a portion of a signal processor chip showing detector/amplifier cells of an IR focal plane array of the present invention.

FIG. 1 is a diagrammatic overview of a portion of a signal processor chip 10 of an IR FPA having a plurality of detector cells with associated readout circuitry. Chip 10 illustrates a representative embodiment of the ESBDI scheme of the present invention for achieving high unit cell density. Processor chip 10 comprises a plurality of detector cells. Each detector cell includes a detector pad 14 having an indium bump 15 for mating with a corresponding HgCdTe detector pixel, thereby forming a hybrid array. Each detector cell forms part of an input amplifier cell, such as input amplifier cell 12 illustrated by a dotted line. Amplifier cell 12 comprises ESBDI readout circuitry 16 of the present invention and an electrical bus 18 for connecting the plurality of cells to a multiplexer 19. The pitch of amplifier cell 12, indicated by the dimensions of the dotted line surrounding the cell, is a measure of the "real estate" needed for each detector/amplifier cell of signal processor chip 10.

As illustrated in FIG. 1, readout circuitry 16 is shared by a group of several neighboring detector cells to increase cell density on chip 10. This shared amplifier design can be embedded within a much larger two-dimensional array of detector cell groups, each group of cells having its own amplifier. Thus, the architecture of the present invention is scalable to very large staring FPAs without sacrificing the processor duty cycle beyond that needed for a single group of cells. This design of the present invention contrasts with prior art optomechanically scanned arrays, in which duty cycle and sensitivity typically drop in proportion to the size of the array and image scanned.

Figure 2:
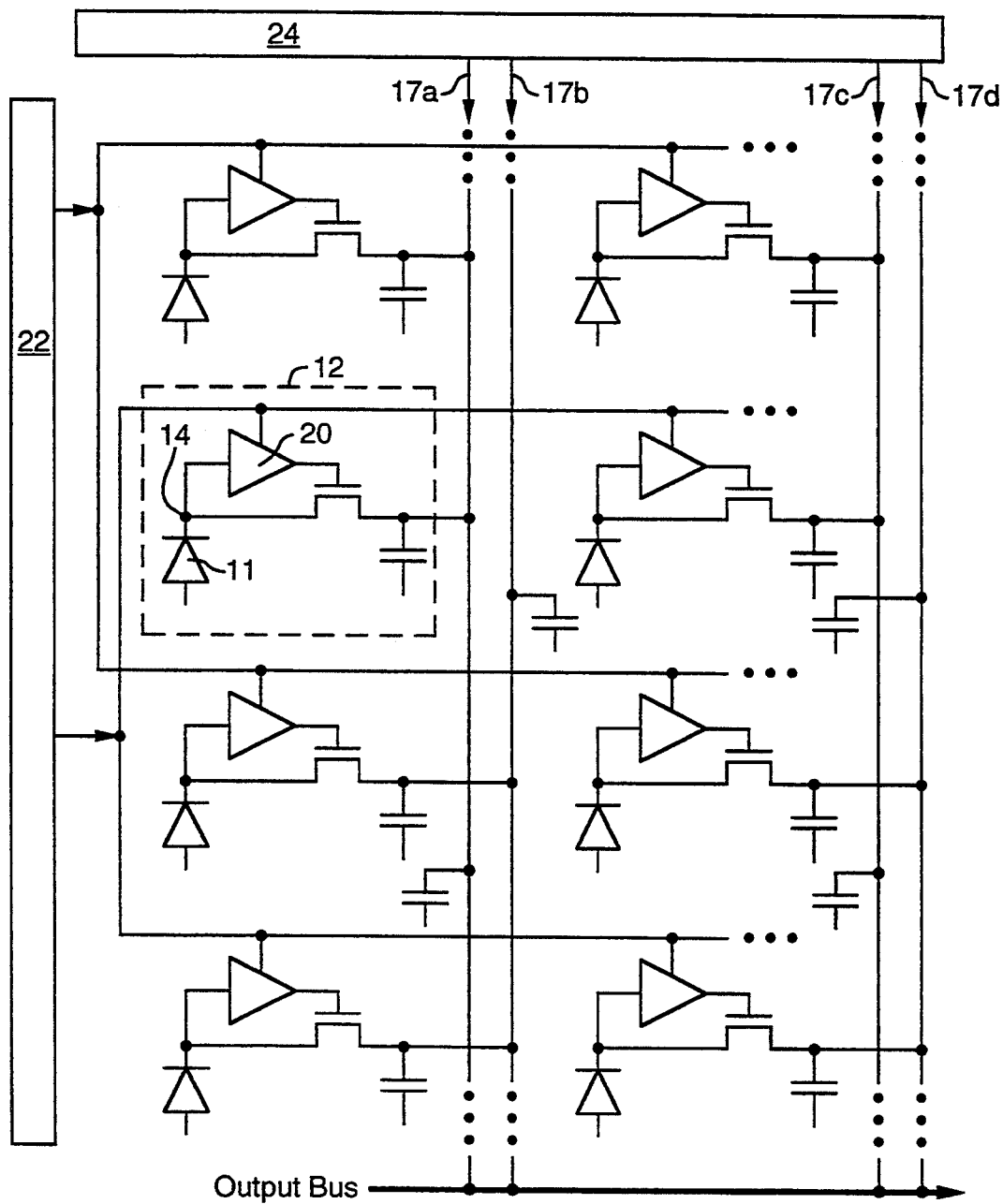
FIG. 2 is a schematic block diagram of an electronically scanned readout circuit of the present invention designed for an IR focal plane array.

An ESBDI circuit of the present invention is illustrated in FIG. 2 as a schematic block diagram. The circuit incorporates features in the silicon starting material and the detector interface architecture that together provide low input impedance, detector bias uniformity, high detector cell density, high charge capacity, and enhanced long wavelength IR sensitivity. Electronic scanning is performed using robust solid state electronics to emulate and improve upon optomechanical scanning, which is normally performed in line arrays using mechanical assemblies. FIG. 2 illustrates detector signal integration and multiplexing functions for a simple $2 \times 4$ element array, in which two of the four rows are integrating at any given time. Input amplifier cell 12 for detector 11 of FIG. 2 corresponds generally to cell 12 illustrated in FIG. 1. A horizontal shift register 22 shown in FIG. 2 provides clock signals that turn on the input amplifiers, such as amplifier 20 that comprises part of readout circuitry 16, thus enabling signal integration in the selected rows. A vertical shift register 24 subsequently multiplexes the elements in each row at the video rate on a column-by-column basis on output lines 17a–d. External clocks (not shown), including a master clock, line sync, frame sync, and bus access, are also needed for operation of signal processor chip 10, as is well known in the art.

Figure 3:
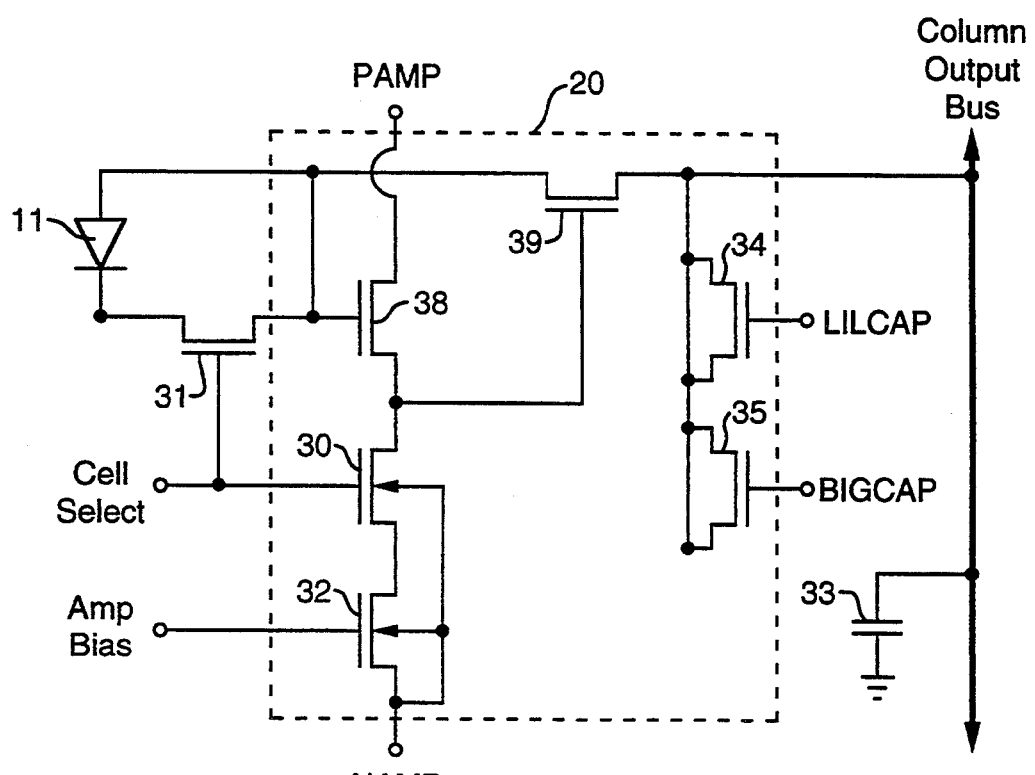
FIG. 3 is a schematic circuit diagram of an amplifier input cell of an electronically scanned buffered direct injection (ESBDI) circuit of the present invention.

Amplifier 20, which includes an inverter amplifier having a cascode transistor, such as a cascoded CMOS FET 30 for example, is illustrated schematically in FIG. 3. Amplifier 20 is designed to provide high voltage amplification using a minimum number of MOSFETs for maximizing amplifier cell density in a long wavelength IR FPA. Amplifier 20 employs cascode FET 30 to stabilize the amplifier operating point and, in conjunction with FET switch 31 connected to the gate of a driver FET 38, to provide low noise access for each detector cell. When not accessed, idle detectors are clamped to zero bias (as provided by clamp FET 37 shown in FIG. 4, for example) or an externally adjustable voltage to minimize turn-on transients and lateral collection of photo-generated charge in the active detector elements, thereby preventing excess detector noise and crosstalk. Power supply levels PAMP and NAMP and bias FET 32 are adjusted for subthreshold operation to provide low power consumption. The subthreshold bias capability and uniform detector bias of amplifier 20 derive from use of neutron transmutation doped (NTD) silicon wafers and standard p-well CMOS process. Multiple bus lines, having distributed capacitance 33 along each line, can be used to increase the integration time duty cycle. In addition, input amplifier 20 includes MOS capacitors 34 and 35, which are enabled by control logic signals LILCAP and BIGCAP, respectively, in conjunction with charge injection FET 39 to achieve large overall charge capacity using a minimum of chip real estate.

Figure 4:
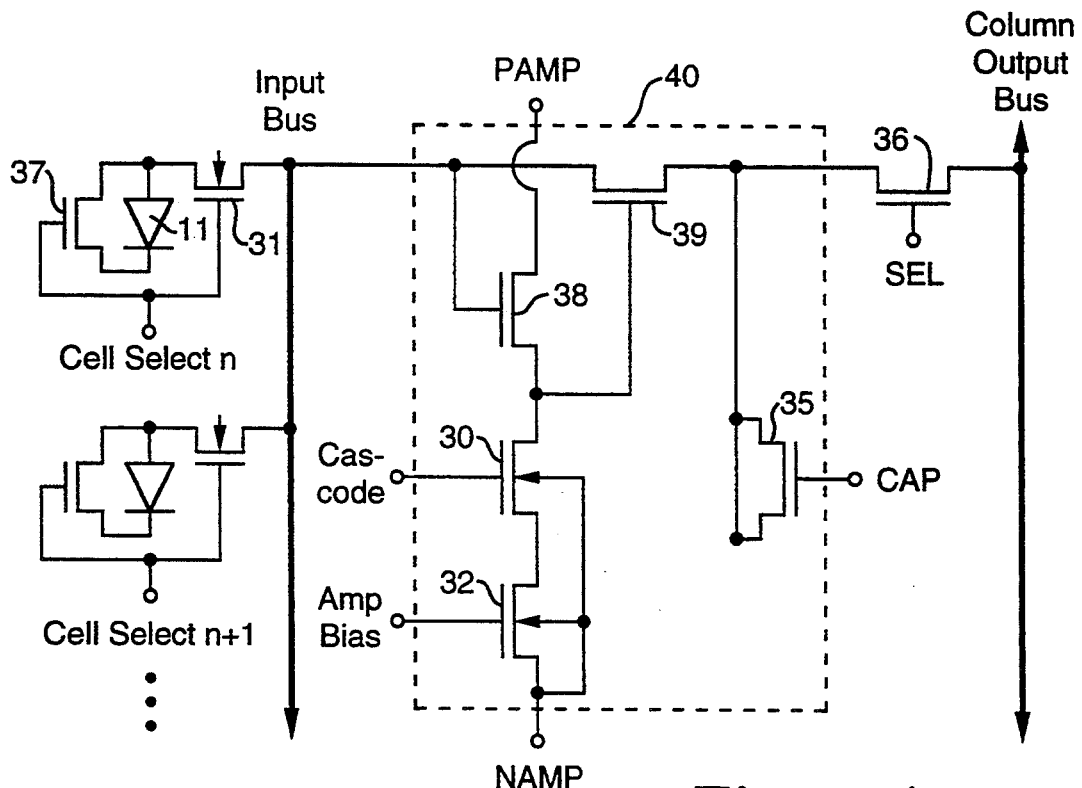
FIG. 4 is a schematic circuit diagram of an embedded electronically scanned buffered direct injection (ESBDI) circuit of the present invention for a high density IR focal plane array.

The ESBDI circuit of the present invention may be used in an embedded amplifier configuration, in which each amplifier 40 is shared among a group of several neighboring detector cells, as previously shown in FIG. 1 and further depicted in FIG. 4. This scheme can be used to increase cell density and reduce the detector-/amplifier cell pitch to about 25 μm or less. In FIG. 4, amplifier 40 is shared by a group of neighboring detector cells (i.e., detector cells n, n+1, etc.) connected to an input bus. Each detector has its own detector cell select circuitry, as illustrated, including FET switch 31 for connecting detector 11 to the input bus and clamp FET 37 for clamping detector 11 to cell ground when FET switch 31 is open. Amplifier 40 includes a MOS capacitor 35 (similar to that of amplifier 20). A switch 36 is added for selectably connecting amplifier 40 to the output bus, thereby multiplexing a plurality of amplifiers on the output bus. The remaining components of amplifier 40 are essentially the same as those of amplifier 20 illustrated in FIG. 2, except that amplifier 40 is shared by the group of neighboring detector cells n, n+1, etc. An FPA layout having eight detector cells sharing each amplifier 40 has been tested to prove the capability. By using a shared amplifier and distributed capacitance, a low impedance detector interface having selectable charge capacity can be designed for a high density LWIR FPA detector having detector/amplifier cell pitch less than 30 μm.

It should be noted that in the embedded amplifier configuration of FIG. 4, each output bus is typically used for many more cells than illustrated. This configuration requires that the integration capacitors (such as capacitor 35 enabled by signal CAP) within each shared amplifier cell be adequate to store charge from a detector during the time the other detector cell groups are being interrogated through the output bus. In this embodiment, therefore, the use of distributed capacitance along the output bus is of much less importance.

As described above, the present invention comprises a combination of components that provide enhanced sensitivity for staring LWIR FPAs. Key components and important advantages of the invention include: cascoded CMOS inverter amplifiers with a limited number of MOSFETs for high voltage amplification and high cell density; a cascode FET in each amplifier to stabilize the amplifier operating point and to provide low noise access for each unit cell; distributed capacitance along each bus line, including bus line capacitance plus additional discrete capacitors that can be enabled via control logic, to achieve large overall charge capacity in a minimum of chip real estate; multiple bus lines and pipelined topology to maximize the integration time duty cycle; neutron transmutation doped (NTD) wafer materials to provide state-of-the-art ($\sigma < 0.5$ mV) threshold uniformity and low power dissipation without the need for additional auto-zero or chopper stabilization circuitry; a clamp function for idle IR detectors to eliminate transients, excess detector noise, and crosstalk; and flexibility to share each amplifier among several pixels for further reduction in cell pitch.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. An electronic circuit for readout of an IR focal plane array having a plurality of IR detector cells, comprising:

a plurality of inverter amplifiers, said inverter amplifiers comprising integrated circuits fabricated on a neutron transmutation doped (NTD) silicon wafer using a p-well CMOS process to provide threshold uniformity and low power dissipation;

each of said amplifiers having an input, an output, a driver FET, a bias FET, a cascode FET, and a charge storage capacitor connected to said amplifier output, each of said FETs having a gate, a source, and a drain, said amplifier input connected to the gate of said driver FET, the drain of said driver FET connected to the drain of said cascode FET, the source of said cascode FET connected to the drain of said bias FET, the source of said bias FET connected to a power supply, and the drains of said driver FET and said cascode FET further connected to a means for controlling said amplifier output;

a plurality of FET switches, each of said FET switches connecting one of said IR detector cells to said input of one of said amplifiers;

a first shift register connected for providing cell select clock signals to the gates of said cascode FETs and FET switches for accessing said detector cells and clamping idle ones of said detector cells to normal operating bias to eliminate excess detector noise and crosstalk;

a second shift register for multiplexing said amplifiers to an output bus connected to said amplifier outputs; and said output bus having distributed capacitance for providing additional detector-generated charge storage capacity.

2. The circuit of claim 1, wherein each of said amplifier inputs comprises an input bus for connecting said amplifier to said FET switches of a group of neighboring detector cells.

3. An electronic circuit for readout of an IR focal plane array having a plurality of groups of neighboring IR detector cells, comprising:

a plurality of CMOS inverter amplifiers corresponding to said plurality of groups of IR detector cells, each of said CMOS amplifiers comprising an integrated circuit fabricated on a neutron transmutation doped (NTD) silicon wafer using a p-well CMOS process to provide threshold uniformity and low power dissipation;

each of said CMOS amplifiers having an input bus, an output, a driver FET, a bias FET, a cascode FET, and a charge storage capacitor connected to said amplifier output, each of Said FETs having a gate, a source, and a drain, said input bus connected to the gate of said driver FET, the drain of said driver FET connected to the drain of said cascode FET, the source of said cascode FET connected to the drain of said bias FET, the source of said bias FET connected to a power supply, and the drains of said driver FET and said cascode FET further connected to a means for controlling said amplifier output;

a plurality of FET switches, each of said FET switches connected between one of said IR detector cells and one of said input buses, each of said groups of neighboring IR detector cells thereby connected to said input bus of said corresponding one of said CMOS amplifiers;

an output bus having distributed capacitance for providing additional detector-generated charge storage capacity;

each of said cascode FETs and FET switches having a gate connected to received cell select clock signals for accessing specific ones of said IR detector cells and clamping idle ones of said IR detector cells to normal operating bias to eliminate excess detector noise and crosstalk; and means for multiplexing said amplifier outputs of said plurality of CMOS amplifier on said output bus.

4. The circuit of claim 3, wherein each of said CMOS amplifiers has an integration duty cycle, and wherein said plurality of CMOS amplifiers provide readout capability for the focal plane array without significant loss of said duty cycle.

5. An electronic circuit for readout of a group of neighboring IR detector cells of an IR focal plane array, comprising:

a CMOS inverter amplifier comprising an integrated circuit fabricated on a neutron transmutation doped (NTD) silicon wafer using a p-well CMOS process to provide threshold uniformity and low power dissipation;

an input bus connecting said group of neighboring IR detector cells to said CMOS amplifier;

said CMOS amplifier comprising an amplifier output, a driver FET, a cascode FET, a bias FET, and a charge storage capacitor connected to said amplifier output, each of said FETs having a gate, a source, and a drain, said input bus connected to the gate of said driver FET, the drain of said driver FET connected to the drain of said cascode FET, the source of said cascode FET connected to the drain of said bias FET, the source of said bias FET connected to a power supply, and the drains of said driver FET and said cascode FET further connected to a means for controlling said amplifier output;

a plurality of FET switches, each of said FET switches connected between said input bus and a corresponding one of said IR detector cells;

an output bus connected to said CMOS amplifier output; and said output bus having distributed capacitance for providing additional detector-generated charge storage capacity.

6. The electronic circuit of claim 5, wherein said cascode FET and each of said FET switches have gates connected to receive cell select clock signals for accessing specific ones of said IR detector cells and clamping idle ones of said IR detector cells to normal operating bias to eliminate excess detector noise and crosstalk.

7. The electronic circuit of claim 6, further comprising:

a plurality of groups of neighboring IR detector cells, each of said groups of IR detector cells connected to one of a corresponding plurality of said CMOS amplifiers; and means for multiplexing said amplifier outputs of said plurality of CMOS amplifiers on said output bus.

8. The electronic circuit of claim 7, wherein each of said CMOS amplifiers has an integration duty cycle, and wherein said plurality of CMOS amplifiers provide readout capability for the focal plane array without significant loss of said duty cycle.

* * * * *